(12) United States Patent
Bibette et al.

(10) Patent No.: US 9,145,489 B2
(45) Date of Patent: Sep. 29, 2015

(54) PROCESS FOR PREPARING A MASTERBATCH IN THE LIQUID PHASE

(75) Inventors: Jérôme Bibette, Paris (FR); Fernando Martinez Pedrero, Madrid (ES); Benoît De Gaudemaris, Clermont-Ferrand Cedex (FR); Julien Berriot, Clermont-Ferrand Cedex (FR)

(73) Assignees: COMPAGNIE GENERAL DES ETABLISSEMENTS MICHELIN, Clermont-Ferrand (FR); MICHELIN RECHERCHE ET TECHNIQUE, Granges-Paccot (CH)

( * ) Notice: Subject to any disclaimer, the term of this patent is extended or adjusted under 35 U.S.C. 154(b) by 84 days.

(21) Appl. No.: 13/995,082

(22) PCT Filed: Dec. 21, 2011

(86) PCT No.: PCT/EP2011/073664
§ 371 (c)(1),
(2), (4) Date: Aug. 30, 2013

(87) PCT Pub. No.: WO2012/085137
PCT Pub. Date: Jun. 28, 2012

(65) Prior Publication Data
US 2014/0011922 A1    Jan. 9, 2014

(30) Foreign Application Priority Data

Dec. 23, 2010  (FR) ..................................... 10 61183

(51) Int. Cl.
| | |
|---|---|
| *C08C 1/14* | (2006.01) |
| *C08K 5/54* | (2006.01) |
| *B60C 1/00* | (2006.01) |
| *C08J 3/22* | (2006.01) |
| C08K 3/34 | (2006.01) |
| C08K 9/06 | (2006.01) |

(52) U.S. Cl.
CPC ............. *C08K 5/5406* (2013.01); *B60C 1/0016* (2013.04); *C08C 1/14* (2013.01); *C08J 3/226* (2013.01); *C08J 2407/02* (2013.01); *C08J 2409/10* (2013.01); *C08K 3/34* (2013.01); *C08K 9/06* (2013.01)

(58) Field of Classification Search
CPC ........... B60C 1/0016; C08C 1/14; C08J 3/226
USPC ............................. 523/333, 351; 524/492, 495
See application file for complete search history.

(56) References Cited

U.S. PATENT DOCUMENTS

| | | | |
|---|---|---|---|
| 5,763,388 A | 6/1998 | Lightsey et al. | |
| 5,977,238 A | 11/1999 | Labauze | |
| 6,013,718 A | 1/2000 | Cabioch et al. | |
| 6,503,973 B2 | 1/2003 | Robert et al. | |
| 6,815,473 B2 | 11/2004 | Robert et al. | |
| 2002/0086917 A1* | 7/2002 | Chung et al. .................. | 523/351 |
| 2006/0089445 A1 | 4/2006 | Gandon-Pain | |

FOREIGN PATENT DOCUMENTS

| | | |
|---|---|---|
| BE | 541816 | 10/1955 |
| EP | 1 127 909 A1 | 8/2001 |
| EP | 1 834 980 A1 | 9/2007 |
| FR | 2 740 778 A1 | 5/1997 |
| FR | 2 765 882 A1 | 1/1999 |
| JP | 2007-224067 A | 9/2007 |
| JP | 2010-189511 A | 9/2010 |
| WO | WO 01/10946 A2 | 2/2001 |
| WO | WO 01/92402 A1 | 12/2001 |
| WO | WO 2004/061983 A1 | 7/2004 |
| WO | WO 2004/096865 A2 | 11/2004 |
| WO | WO 2006/032503 A2 | 3/2006 |
| WO | WO 2008/141702 A1 | 11/2008 |
| WO | WO 2009/000750 A1 | 12/2008 |
| WO | WO 2009/000752 A1 | 12/2008 |
| WO | WO 2010/011345 A1 | 1/2010 |

OTHER PUBLICATIONS

International Search Report (PCT/ISA/210) issued on Apr. 18, 2012, by the European Patent Office as the International Searching Authority for International Application No. PCT/EP2011/073664.

* cited by examiner

*Primary Examiner* — Edward Cain
(74) *Attorney, Agent, or Firm* — Dickinson Wright PLLC (57) ABSTRACT

The invention relates to a process for the preparation of a masterbatch in the liquid phase based on one or more diene elastomers and on one or more fillers which do not coagulate spontaneously with the said latex, comprising the following successive stages:
  preparation of a stable and homogeneous aqueous dispersion (C) by mixing
  one or more diene elastomer latexes (A) with
  one or more stable aqueous dispersions (B) of one or more fillers which do not coagulate spontaneously with the said latex and which are partially hydrophobized,
  homogenization of the aqueous dispersion (C),
  coagulation within the aqueous dispersion (C) of the diene elastomer latex with the fillers which do not coagulate spontaneously with the said latex by supplying mechanical energy,
  recovery of the coagulum, then
  drying the recovered coagulum in order to obtain the masterbatch.

25 Claims, 1 Drawing Sheet

PROCESS FOR PREPARING A MASTERBATCH IN THE LIQUID PHASE

BACKGROUND

1. Field

The invention relates to a process for the preparation of a masterbatch in the liquid phase of one or more diene elastomers, in particular a natural rubber latex, and of one or more fillers.

The term "masterbatch" is understood to mean an elastomer-based composite into which one or more fillers and optionally other additives has/have been introduced.

2. Description of Related Art

It is known that, in order to obtain the optimum reinforcing properties conferred by a filler in a tire tread and thus a high wear resistance, it is advisable generally for this filler to be present in the elastomeric matrix in a final form which is both as finely divided as possible and as homogeneously distributed as possible. In point of fact, such conditions can only be achieved in so far as this filler exhibits a very good ability, on the one hand, to be incorporated in the matrix during the mixing with the elastomer and to deagglomerate and, on the other hand, to disperse homogeneously in this matrix.

In point of fact, in order to improve the dispersibility of the filler in the elastomeric matrix, it is known to resort to a mixing of elastomer and filler in the "liquid" phase. In order to do this, recourse is had to an elastomer in the latex form and to an aqueous dispersion of the filler, commonly referred to as "slurry".

The problem of the uniform dispersion of the fillers and in particular carbon black within the rubber had already been posed from 1955. Thus, there is known, from the document BE 541816, a process for the preparation of a masterbatch of rubber and of carbon black in the liquid phase. This process is carried out continuously and uses hydraulic impacts or intense mechanical stirring to bring about the dispersion of the carbon black within the elastomeric matrix.

Fillers other than carbon black can be used, such as silica. U.S. Pat. No. 5,763,388 teaches a process for the preparation in the liquid phase of a masterbatch of a polymer latex and of silica as filler, comprising the incorporation within the latex of modified silica, that is to say silica which has reacted with a coupling agent. According to this document, this modification of the silica makes it possible to uniformly disperse the modified silica within the polymer latex.

The document WO 2010/011345 for its part discloses the hydrophobation of the silica in order to act on the scorch and the viscosity of the masterbatch obtained.

It emerges from these documents that it is difficult to control the homogeneity in the distribution of the fillers within the masterbatch, the limiting factor being related in particular to the coagulation phase, which is difficult to control.

SUMMARY

Thus, a process for the preparation of a masterbatch is being sought for which results in a masterbatch which exhibits a uniform distribution of the filler throughout the product, which exhibits a satisfactory yield by weight and which exhibits a satisfactory filler/elastomer ratio, this process having to be easy to carry out using simple equipment.

Furthermore, it would be advantageous to be able to exhibit better control over, indeed even to be in command of, the homogenization and coagulation phases, so as to be able to influence the distribution of the filler within the coagulum.

In point of fact, the Applicant Companies have discovered that it is possible to control the homogenization of the mixture of the elastomer and filler before the coagulation phase, thus making it possible to improve the distribution of the fillers in the elastomeric matrix and to bring about the participation of all the fillers present in the matrix, thus resulting in a very good yield by weight while observing the content of filler previously introduced.

The invention thus relates to a process for the preparation of a masterbatch in the liquid phase based on one or more diene elastomers and on one or more fillers which do not coagulate spontaneously with the said latex, comprising the following successive stages:

preparation of a stable and homogeneous aqueous dispersion (C) by mixing
one or more diene elastomer latexes (A) with
one or more stable aqueous dispersions (B) of one or more fillers which do not coagulate spontaneously with the said latex and which are partially hydrophobized,
homogenization of the aqueous dispersion (C),
coagulation within the aqueous dispersion (C) of the diene elastomer latex with the fillers which do not coagulate spontaneously with the said latex by supplying mechanical energy,
recovery of the coagulum, then
drying the recovered coagulum in order to obtain the masterbatch.

The invention also relates to a masterbatch of diene elastomer and of filler prepared according to the process described above.

Another subject-matter of the invention is a rubber composition based on at least one masterbatch of diene elastomer and of filler which does not coagulate spontaneously with the said latex prepared according to the process described above, a finished or semifinished article comprising a composition as defined above and a tire tread comprising a composition as defined above.

Finally, a subject-matter of the invention is a tire or semifinished product comprising at least one rubber composition as defined above.

Other subject-matters, characteristics, aspects and advantages of the invention will become even more clearly apparent on reading the description and examples which follow.

DETAILED DESCRIPTION OF SPECIFIC EMBODIMENTS

The term "homogeneous" is understood to mean, within the meaning of the present invention and conventionally for a person skilled in the art, that the concentration of fillers and/or of elastomer latexes in a given volume is identical to the concentration of fillers and/or of latexes in the total volume of the masterbatch or dispersion.

A person skilled in the art will know how to confirm the homogeneity of the dispersion, if need be, by measurements of concentration of the filler and/or of the elastomer latex using several samples withdrawn at different points of the volume (for example at the surface or deeper in the vessel) of the dispersion.

The desired aim is avoid the formation of pockets of dispersion of fillers within the masterbatch, commonly known as agglomerates.

The expression: composition "based on", should be understood as meaning a composition comprising the mixture and/or the reaction product of the different constituents used, some of these base constituents being capable of reacting or intended to react with one another, at least in part, during the different phases of manufacture of the composition, in particular during the chemical crosslinking thereof.

In the present description, unless expressly indicated otherwise, all the percentages (%) are percentages by weight. Furthermore, any interval of values denoted by the expression "between a and b" represents the range of values extending for more than a to less than b (that is to say, limits a and b excluded) while any interval of values denoted by the expression "from a to b" means the range of values extending from a up to b (that is to say, including the strict limits a and b).

The unit of amount "phr" means parts by weight per hundred parts of elastomer.

Preparation of the Aqueous Dispersion (C)

The first stage of the process according to the invention consists in preparing a stable and homogeneous aqueous dispersion (C) from one or more elastomer latexes (A) with one or more aqueous dispersions of fillers (B).

Stable aqueous dispersion is understood to mean, within the meaning of the present invention, a dispersion in which the constituents of this dispersion do not coagulate, do not flocculate, do not comprise agglomerates and do not settle out, at least at the macroscopic level, that is to say that its state does not change over a predetermined time at ambient temperature and at atmospheric pressure.

More particularly, the stable dispersion does not change at the macroscopic level over time in comparison with the spontaneous coagulation resulting from the mixing of carbon black and a natural rubber latex.

Diene Elastomer Latex (A)

Elastomer in the latex form is understood to mean, within the meaning of the present invention, an elastomer provided in the form of elastomer particles dispersed in water.

The invention relates to diene elastomer latexes, the diene elastomers being defined as follows:

"Diene" elastomer or rubber should be understood as meaning, in a known way, an elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content of units of diene origin, always less than 15%). In the category of "essentially unsaturated" diene elastomers, "highly unsaturated" diene elastomer is understood to mean in particular a diene elastomer having a content of units of diene origin (conjugated dienes) which is greater than 50%.

Furthermore, among these diene elastomers, a distinction is made between natural rubber and synthetic elastomers.

Natural rubber (NR), which is particularly suitable for the invention, exists in different forms, as described in detail in Chapter 3, "Latex concentrates: properties and composition", by K. F. Gaseley, A. D. T. Gordon and T. D. Pendle, in "Natural Rubber Science and Technology", A. D. Roberts, Oxford University Press, 1988.

In particular, several forms of natural rubber latex are commercially available: natural rubber latexes, referred to as field latexes, concentrated natural rubber latexes, epoxidized latexes (ENR), deproteinized latexes, latexes which have been subjected to an amide bond cleavage stage, or prevulcanized latexes. Field natural rubber latex is a latex to which ammonia has been added in order to prevent premature coagulation and concentrated natural rubber latex corresponds to a field latex which has been subjected to a treatment corresponding to washing, followed by concentrating further. The various categories of concentrated natural rubber latex are listed in particular in Standard ASTM D 1076-06. Among these concentrated natural rubber latexes, a distinction is made in particular between concentrated natural rubber latexes of HA (high ammonia) grade and those of LA grade; use may advantageously be made, for the invention, of concentrated natural rubber latexes of HA grade.

The latex can be used directly or can be diluted beforehand in water in order to facilitate the use thereof.

Synthetic diene elastomers capable of being used in accordance with the invention diene elastomer is understood to mean more particularly:

(a) —any homopolymer obtained by polymerization of a conjugated diene monomer having from 4 to 12 carbon atoms;

(b) —any copolymer obtained by copolymerization of one or more conjugated dienes with one another or with one or more vinylaromatic compounds having from 8 to 20 carbon atoms;

(c) —a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d) —a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as aminobenzophenone, for example; for coupling with a reinforcing inorganic filler, such as silica, mention may be made, for example, of silanol or polysiloxane functional groups having a silanol end (such as described, for example, in FR 2 740 778 or U.S. Pat. No. 6,013,718, and WO 2008/141702), of alkoxysilane groups (such as described, for example, in FR 2 765 882 or U.S. Pat. No. 5,977,238), of carboxyl groups (such as described, for example, in WO 01/92402 or U.S. Pat. No.

6,815,473, WO 2004/096865 or US 2006/0089445) or of polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To sum up, the synthetic diene elastomer or elastomers according to the invention are preferably chosen from the group of the highly unsaturated diene elastomers consisting of polybutadienes (abbreviated to "BRs"), synthetic polyisoprenes (IRs), butadiene copolymers, isoprene copolymers and the mixtures of these elastomers. Such copolymers are more preferably chosen from the group consisting of butadiene/styrene copolymers (SBRs), isoprene/-butadiene copolymers (BIRs), isoprene/styrene copolymers (SIRs) and isoprene/butadiene/styrene copolymers (SBIRs).

Thus, as synthetic elastomer latex, the latex can in particular consist of a synthetic diene elastomer already available in the emulsion form (for example, a copolymer of butadiene and of styrene, SBR, prepared in emulsion) or of a synthetic diene elastomer initially in solution (for example an SBR prepared in solution) which is emulsified in a mixture of organic solvent and water, generally using a surface-active agent.

A latex of SBR, in particular an SBR prepared in emulsion ("ESBR") or an SBR prepared in solution ("SSBR"), more particularly an SBR prepared in emulsion, is particularly suitable for the invention.

There exists two main types of processes for the emulsion copolymerization of styrene and of butadiene, one of them, or hot process (carried out at a temperature of approximately 50° C.), being suitable for the preparation of highly branched SBRs while the other, or cold process (carried out at a temperature which can range from 15° C. to 40° C.), makes it possible to obtain more linear SBRs.

For a detailed description of the effectiveness of several emulsifiers which can be used in the said hot process (as a function of the contents of the said emulsifiers), reference may be made, for example, to the two papers by C. W. Carr, I. M. Kolthoff and E. J. Meehan, University of Minnesota, Minneapolis, Minn., which appeared in the Journal of Polymer Science in 1950, Vol. V, No. 2, pp. 201-206, and in 1951, Vol. VI, No. 1, pp. 73-81.

As regards comparative examples of implementation of the said cold process, reference may be made, for example, to the paper Industrial and Engineering Chemistry, 1948, Vol. 40, No. 5, pp. 932-937, E. J. Vandenberg, G. E. Hulse, Hercules Powder Company, Wilmington, Del., and to the paper Industrial and Engineering Chemistry, 1954, Vol. 46, No. 5, pp. 1065-1073, J. R. Miller and H. E. Diem, B. F. Goodrich Chemical Co., Akron, Ohio.

In the case of an SBR (ESBR or SSBR) elastomer, use is made in particular of an SBR having a moderate styrene content, for example of between 20% and 35% by weight, or a high styrene content, for example from 35 to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

It should be noted that it is possible to envisage using one or more natural rubber latexes as a blend, one or more synthetic rubber latexes as a blend or a blend of one or more natural rubber latexes with one or more synthetic rubber latexes.

According to a preferred embodiment of the invention, the process employs an aqueous natural rubber dispersion and more particularly a concentrated natural rubber latex and in particular a concentrated natural rubber latex of "HA" (high ammonia) grade or of "LA" grade. More particularly, the concentrated natural rubber latex of "HA" (high ammonia) grade is used.

The concentration of natural rubber in the aqueous dispersion (A) is from 10 to 65% by weight, preferably from 30 to 65% by weight and in particular from 40 to 65% by weight, with respect to the total weight of the dispersion.

Stable Aqueous Dispersion of One or More Fillers (B)

Stable aqueous dispersion, as defined above for the aqueous dispersion (C), is understood to mean a dispersion in which the constituents of this dispersion, that is to say the fillers, do not coagulate, do not flocculate, do not comprise agglomerates and do not settle out, at least at the macroscopic level, that is to say that its state does not change over a predetermined time at ambient temperature and at atmospheric pressure.

Use may be made of any type of reinforcing filler known for its abilities to reinforce a rubber composition which can be used for the manufacture of tires, with the proviso that these fillers do not coagulate spontaneously with the diene elastomer.

The fillers according to the invention can be chosen from a reinforcing organic filler, a reinforcing inorganic filler, such as a silica, a hybrid organic/inorganic filler, a polymer-based filler and their mixtures, these fillers all being hydrophilic.

Aqueous Dispersion of One or More Reinforcing Inorganic Fillers

"Reinforcing inorganic filler" according to the invention should be understood, in the present patent application, by definition, as meaning any inorganic or mineral filler (whatever its colour and its origin (natural or synthetic)), also known as "white filler", "clear filler" or indeed even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black. In the context of the present invention, such a filler is characterized by its hydrophilic nature, that is to say, generally, in a known way by the presence of hydroxyl (—OH) groups at its surface.

The physical state under which the reinforcing inorganic filler is provided is not important, whether it is in the form of a powder, of microbeads, of granules, of beads or any other appropriate densified form. Of course, reinforcing inorganic filler is also understood to mean mixtures of different reinforcing inorganic fillers, in particular of siliceous and/or aluminous fillers as described below.

Mention may be made, as silica, of precipitated, fumed or colloidal silica. Mention may be made, as inorganic filler, of silica ($SiO_2$), alumina ($Al_2O_3$), alumina monohydrate ($Al_2O_3.H_2O$), aluminium hydroxide [$Al(OH)_3$], aluminium carbonate [$Al_2(CO_3)_3$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium dioxide ($TiO_2$), titanium black ($TiO_{2n-1}$), calcium oxide (CaO), calcium hydroxide [$Ca(OH)_2$], aluminium magnesium oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminium silicate ($Al_2SiO_5.Al_4(SiO_4)_3.5H_2O$), magnesium silicate ($Mg_2SiO_4.MgSiO_3$), calcium silicate ($Ca_2SiO_4$), aluminium calcium silicate ($Al_2O_3.CaO.2SiO_2$), calcium magnesium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$], and crystalline aluminosilicates comprising atoms of hydrogen compensating for the charges, alkali metals or alkaline earth metals, such as zeolites, and their mixture.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2$/g, preferably from 30 to 400 $m^2$/g. Mention will be made, as precipitated silicas, for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber and silicas having a high specific surface, such as described in Application WO 03/16837.

According to another embodiment of the invention, the diene elastomer employed is natural rubber and the inorganic filler used is silica.

In contrast to carbon black, the filler employed according to the invention does not coagulate spontaneously with natural rubber. In the specific case of silica, the silica aggregates are typically hydrophilic and have more affinity with the water than with the elastomer particles themselves.

Nevertheless, various solutions have been provided in order to make it possible to obtain the coagulation and good dispersion of the filler in the elastomeric matrix in the liquid phase.

Thus, it is necessary to surface modify the filler according to the invention in order to create the necessary affinity between the filler particles and the elastomer particles. The ability of the filler to coagulate with the elastomer originates from its surface properties.

In point of fact, it has been observed, surprisingly, that the presence of a partially hydrophobized filler within the aqueous dispersion (B) makes possible the coagulation of the aqueous dispersion (C). Furthermore, it has been observed, with an unchanging supply of mechanical energy introduced into the aqueous dispersion (C), that the duration of the phase of homogenization of the dispersion (C) is a function of the degree of hydrophobation of the filler.

In order to render hydrophobic the filler according to the invention, there is grafted, to the particle, one or more hydrophobing agents of following general formula (I):

$$E_n\text{-F} \qquad \text{(Formula I)}$$

in which:
n is an integer equal to 1 or 2,
when n has the value 1, then F is a monovalent group,
when n has the value 2, then F is a divalent group,
E represents a functional group which is capable of bonding physically and/or chemically to the filler and which comprises, in its structure, at least one alkyl or alkylene chain comprising from 1 to 18 carbon atoms which confers hydrophobing properties on the group E,
F represents a group which may or may not bond physically and/or chemically to the diene elastomer.

Advantageously, the hydrophobing agent is of following formula (II):

$$[G_{(3-m)}(L\text{-}K)_m\text{Si-L-}]_n\text{-F} \qquad \text{(II)}$$

with:
when n has the value 1, then F denotes the K group defined below and m varies from 0 to 2, and
when n has the value 2, then F denotes an amino group, a polysulphide ($S_x$) group or an epoxy group and m varies from 0 to 2,
and for which
the G groups are chosen, independently of one another, from a hydrogen atom, a $C_1$-$C_{18}$ hydrocarbon group chosen from linear, branched or cyclic alkyl groups, aralkyl groups, alkylaryl groups and aryl groups, such as a phenyl, a benzyl, a cyclopentyl, a cyclohexyl, an alkoxy ($R_1O$)— group, in which $R_1$ represents a saturated $C_1$-$C_8$ alkyl radical, such as, for example, the methyl, ethyl and isopropyl groups, preferably at least one methyl and ethyl group, a halogen atom, such as fluorine, chlorine, bromine and iodine, and a hydroxyl group,
provided that at least one G group is chosen from an alkoxy group, a chlorine atom or a hydroxyl group,
L denotes a saturated or unsaturated and linear, branched or cyclic $C_1$-$C_{18}$ alkylene radical, preferably of 1 to 8 carbon atoms, such as, for example, the methylene, ethylene, isopropylene, n-butylene, octadecylene, phenylene, cyclopentylene and cyclohexylene groups, optionally comprising an oxygen atom,
K denotes a hydrogen atom, a halogen atom, such as fluorine, chlorine, bromine and iodine, or a functional group chosen from an amino group, a polyaminoalkyl group, a mercapto group, an epoxy group, a hydroxyl group, a vinyl group, an acryloxy group, a methacryloxy group, an —SCN group or an R(CO)S— group with R being a $C_1$-$C_{18}$ alkyl group.

Preferably, m=0.

Thus, according to a first specific embodiment of the invention, the hydrophobing agent is of following formula (III):

$$G_3\text{Si-L-K} \qquad \text{(III)}$$

with G, L and K being as defined above.

According to a second specific embodiment of the invention, the hydrophobing agent is of following formula (IV):

$$[G_3Si-L-]_2-F \quad (IV)$$

with G, L and F being as defined above.

Preferably, the hydrophobing agent is chosen from chlorotrimethylsilane, chlorotriethylsilane, chlorotripropylsilane, bromotrimethylsilane, bromotriethylsilane, bromotripropylsilane, fluorotrimethylsilane, methoxytrimethylsilane, methoxytriethylsilane, methoxytripropylsilane, chlorotrimethylsilane, dichlorodimethylsilane, trichloromethylsilane, bromotrimethylsilane, dibromodimethylsilane, tribromomethylsilane, methoxytrimethylsilane, dimethoxydimethylsilane, trimethoxymethylsilane, tetramethoxysilane, trimethoxypropylsilane, trimethoxyoctylsilane, trimethoxyhexadecylsilane, dimethoxydipropylsilane, triethoxymethylsilane, triethoxypropylsilane, triethoxyoctylsilane, diethoxydimethylsilane, octenyldimethylchlorosilane, octodecyltrichlorosilane, (γ-aminopropyl)trimethoxysilane, (γ-aminopropyl)triethoxysilane, (gamma-hydroxypropyl)tripropoxysilane, (γ-mercaptopropyl)triethoxysilane, (γ-aminopropyl)dimethylethoxysilane, (γ-aminopropyl)dihydroxymethoxysilane, (glycidylpropyl)trimethoxysilane, [γ-(N-aminoethyl)aminopropyl]triethoxysilane, (γ-methacryloxypropyl)triethoxysilane, (γ-methacryloxypropyl)trimethoxysilane, (β-mercaptoethyl)triethoxysilane, [γ-(N-aminoethyl)propyl]trimethoxysilane, (N-methylaminopropyl)trimethoxysilane, (γ-thiocyanatopropyl)triethoxysilane, bis-(3-triethoxythiopropyl)silane tetrasulphide, vinyltriethoxysilane, vinylphenylmethylsilane, vinyldimethylmethoxysilane, divinyldimethoxysilane, divinylethyldimethoxysilane, dimethylvinylchlorosilane and their mixture.

Mention should in particular be made, among the known alkoxysilane polysulphide compounds, of bis(3-triethoxysilylpropyl)tetrasulphide (abbreviated to "TESPT"), of formula $[(C_2H_5O)_3Si(CH_2)_3S_2]_2$, sold in particular by Degussa under the name "Si69", in the form of a commercial mixture of polysulphides $S_x$ with a mean value for x which is approximately 4.

According to a preferred embodiment of the invention, the hydrophobing agent is chosen from octenyldimethylchlorosilane, bis(3-triethoxysilylpropyl)tetrasulphide and their mixture.

According to the invention, one of the alkoxy groups or the halogen atom carried by the silane will react with a silanol group present at the surface of the silica, when the filler according to the invention is silica.

Preferably, the hydrophobing agent, once attached to the filler, comprises at most 30 carbon atoms and more particularly from 1 to 25 carbon atoms.

Partially hydrophobized filler is understood to mean, within the meaning of the present invention, a filler which carries sufficient hydrophobing agents to make possible the coagulation of the filler with the elastomer, while preventing the filler from carrying too much of them, which would result in a filler not dispersible in water.

Preferably, the partially hydrophobized filler is characterized by a degree of hydrophobation of between 0 and 1.10 carbon atoms carried by the hydrophobing agent, once attached to the filler, per nm² of filler surface area.

Preferably, the degree of hydrophobation is between 0 and 0.73 carbon atoms/nm² of surface area and more particularly from 0.18 to 0.30 carbon atoms/nm² of surface area.

The BET specific surface of a filler is generally measured in a way known per se according to the Brunauer-Emmett-Teller method described in "*The Journal of the American Chemical Society*", Vol. 60, page 309, February 1938, corresponding to Standard ISO 5794/1.

Preparation of the Aqueous Filler Dispersion (B)

The filler or fillers according to the invention are subsequently dispersed in water, preferably so as to obtain a dispersion having a viscosity sufficient to be able to be easily handled.

Advantageously, the dispersion is subjected to ultrasound in order to make it possible to obtain stability of the aggregates in water, which makes it possible to improve the dispersibility of the aqueous filler dispersion in the masterbatch subsequently produced.

The concentration of fillers in the aqueous dispersion (B) comprising the fillers is preferably between 0.1 and 20% by weight, preferably between 1 and 15% by weight, with respect to the water present in the aqueous filler dispersion (B).

Bringing the Two Dispersions into Contact and Homogenization Phase

The latex of the diene elastomer (A) and the stable filler dispersion (B) are brought into contact. The filler slurry is slowly poured into the elastomer latex, or vice versa, with stirring, preferably slow stirring, so as to ensure good homogenization of the medium. The simultaneous mixing together of the dispersions (A) and (B) with a controlled flow rate can also be envisaged.

As explained above, the degree of hydrophobation of the silica constitutes a parameter which directs the kinetics of the coagulation of the medium, this being done while keeping constant the supply of mechanical energy applied when the two dispersions are brought into contact.

The process according to the invention thus makes it possible to control, indeed even to be in command of, the coagulation of the medium. The control of the duration of the phase of homogenization of the latex and of the slurry makes it possible to directly influence the homogeneity of the medium and of the final masterbatch.

The more effective the homogenization phase, the more homogeneous the distribution of the fillers in and the coagulum.

Coagulation Phase

Once the homogenization has been carried out, the coagulation phase arrives.

The coagulation can be brought about by introducing, to the system, a sufficient supply of mechanical energy. For example, a significant increase in the shear rate can be applied to the medium. It is also possible to compress the system. This supply of mechanical energy will simultaneously destabilize the whole volume and bring about the coagulation of the aqueous dispersion (C).

Another possibility is to leave the aqueous dispersion (C) under an unchanging supply of mechanical energy, that is to say a supply identical to the supply used during the homogenization phase, for example by retaining an unchanging shear rate for these two phases: homogenization and coagulation.

When the mechanical energy introduced into the system is applied in the form of action of the shearing, static mixers or else dynamic mixers, such as paddle stirrers, can be used.

It is possible to use any type of device which makes possible efficient mixing of two products in the liquid phase; thus, it will be possible to use a static mixer, such as those sold by Noritake Co. Limited, TAH in the USA, Koflo in the USA or Tokushu Kika Kogyo Co. Ltd, or a mixer which produces high shear, such as mixers sold by Tokushu Kika Kogyo Co. Ltd, by PUC in Germany, by Cavitron in Germany or by Silverson in the United Kingdom.

During the phase of coagulation of these two dispersions, a coagulum of elastomer and of filler is formed, either in the form of just one solid component in the solution or in the form of several separate solid components.

The volume of aqueous dispersion of the filler (B) depends on the filler content targeted for the masterbatch to be produced, on the volume of the diene elastomer latex (A) and on their respective concentrations.

Thus, the volume will consequently be adjusted. Advantageously, the filler content targeted for the masterbatch is between 10 and 150 phr, preferably between 10 and 100 phr, more preferably between 15 and 90 phr and more preferably still between 15 and 70 phr.

Preferably, the process according to the invention does not comprise the addition of a coagulating agent. It is the supply of the mechanical energy to the system which brings about the coagulation.

Thus, the amount of mechanical energy introduced into the system and the degree of hydrophobation of the silica are two parameters which make possible the control of the homogenization and coagulation phases.

According to another embodiment, it is possible to add one or more coagulating agents to the dispersion (C), so as to improve the yield of the coagulation stage. Should this happen, the coagulating agent is not the factor responsible for the triggering of the coagulation.

Recovery of the Solid Form

The solid or solids are recovered, for example, by filtration or by centrifuging. This is because the filtering operation, which can be carried out using a filtration sieve, may prove to be unsuitable when the coagulum exists in the form of numerous small solid components. In such a case, an additional centrifuging operation is preferably carried out.

On conclusion of this recovery stage, the coagulum obtained is dried, for example in an oven.

The process according to the invention can be carried out both continuously and batchwise.

Additives

The diene elastomer latex (A) in accordance with the invention and the aqueous filler dispersion (B) in accordance with the invention can also comprise all or a portion of the usual additives generally used in elastomer compositions intended for the manufacture of tires, in particular treads, such as, for example, plasticizers or extending oils, whether the latter are aromatic or nonaromatic in nature, pigments, protection agents, such as antiozone waxes, chemical antiozonants, antioxidants, antifatigue agents, reinforcing resins, methylene acceptors (for example phenolic novolak resin) or methylene donors (for example, HMT or H3M), such as are described, for example, in Application WO 02/10269, a crosslinking system based either on sulphur or on sulphur donors and/or on peroxides and/or on bismaleimides, vulcanization accelerators or vulcanization activators, with the exception, of course, of zinc-based activators (or in accordance with the 0.5 phr maximum for zinc in the composition, and preferably less than 0.3 phr).

Preferably, these dispersions comprise, as preferred non-aromatic or very slightly aromatic plasticizing agent, at least one compound chosen from the group consisting of naphthenic oils, paraffinic oils, MES oils, TDAE oils, glycerol esters (in particular trioleates), plasticizing hydrocarbon resins exhibiting a high Tg preferably of greater than 30° C., and the mixtures of such compounds.

The additives described above might also be incorporated in the masterbatch after the formation of the coagulum.

It is also possible to add, to the medium, after coagulation, coupling agents, coupling activators, covering agents for the reinforcing inorganic filler or more generally processing aids capable, in a known way, by virtue of an improvement in the dispersion of the inorganic or organic filler in the rubber matrix and of a lowering of the viscosity of the compositions, of improving their property of processing in the raw state, these agents being, for example, hydrolyzable silanes, such as alkylalkoxysilanes (in particular alkyltriethoxysilanes), polyols, polyethers (for example polyethylene glycols), primary, secondary or tertiary amines (for example trialkanolamines), hydroxylated or hydrolyzable POSs, for example α,ω-dihydroxypolyorganosiloxanes (in particular α,ω-dihydroxypolydimethylsiloxanes), fatty acids, such as, for example, stearic acid, and reinforcing fillers other than those described above, such as carbon black.

The invention also relates to a masterbatch of diene elastomer and of filler prepared according to the process described above.

Another subject-matter of the invention is a rubber composition based on at least one masterbatch of diene elastomer and of filler prepared according to the process described above.

The invention also relates to a finished or semifinished article comprising a composition as defined above.

The invention also relates to a tire tread comprising a composition as defined above.

Finally, a subject-matter of the invention is a tire or semifinished product provided with at least one rubber composition as defined above.

The following examples serve to illustrate the invention without, however, exhibiting a limiting nature.

EXAMPLES OF THE IMPLEMENTATION OF THE INVENTION

Equipment used

Model VCX500 Bricel ultrasound generator (ref. Fisher W75043) with a power of 500 W, used at 60% of its maximum power.
Standard sonication probe having a diameter of 13 mm, suitable for the sonication of volumes of between 10 and 250 ml (ref. Fisher 75482).
One magnetic stirrer plus one magnetic bar.
Glassware: beaker with a size of 15 ml (ref. VWRN 15 ml 213-3916) or 500 ml (ref. VWR 50 ml 212-9301).
Reactant: high ammonia natural rubber latex comprising 60% by weight of natural rubber originating from Trang Latex Co. Ltd, Thailand.
Silica powder supplied by Michelin, ground with a mortar, Vozeosil silica (1165 MP from Rhodia).
Distilled water.

Preparation of the Partially Hydrophobized Silica

The silica is ground to give a fine powder using a pestle and mortar. The hydrophobicity of the silica is adjusted by silanization of its surface with octenyldimethylchlorosilane (ODCS).

The partially hydrophobized silica is prepared by reacting 5 g of hydrophilic silica with various amounts of ODCS in the presence of 50 g of toluene (see the table for compositions 1 to 6 below).

The necessary amounts of ODCS are dissolved in toluene. The medium is stirred using a magnetic stirrer. The ground silica powder is added to the medium and the dispersion is left stirring for 2 minutes. The composition is placed in a Petri dish (with a diameter of 18.5 cm) and is placed at a temperature of 70° C. for one hour, so as to make possible the evaporation of the toluene. The powder obtained is dispersed in distilled water after sonication for two minutes.

|            | 1    | 2    | 3    | 4    | 5    | 6    |
|------------|------|------|------|------|------|------|
| Silica in g | 5    | 5    | 5    | 5    | 5    | 5    |
| ODCS in g  | 0.00 | 0.05 | 0.06 | 0.10 | 0.30 | 2.18 |
| Toluene    | 50 g | 50 g | 50 g | 50 g | 50 g | 50 g |

1. Impact of the Supplied Mechanical Energy on the Kinetics of Coagulation at an Unchanging Degree of Hydrophobation of the Silica Masterbatches Prepared A masterbatch is prepared according to a process in accordance with the invention and in the following way.

Preparation of the Aqueous Dispersion (A) of Natural Rubber Latex

The natural rubber latex is weighed out into a glass beaker, a magnetic bar is added thereto and the latex is subsequently diluted in distilled water down to a concentration of 60% by weight of natural rubber.

Preparation of the Aqueous Filler Dispersion (B)

2.32 g of partially hydrophobized silica prepared according to composition 4 described above are dispersed in 20 ml of water. The combined mixture is then homogenized using an ultrasound probe for two minutes. The silica agglomerated on the probe at the end of the two minutes is incorporated in the mixture using a spatula.

Preparation of the Masterbatch 3.3 g of aqueous dispersion (B) are introduced into a 15 ml beaker with a magnetic stirrer. 3.3 g of the aqueous dispersion (A) are added thereto.

Evaluation of the Characteristic Time $\tau$

The aqueous dispersion (C) formed is homogenized at various rotational speeds of the bar (100 and 200 rpm).

Macroscopic coagulation is observed when the beaker is set in motion with the magnetic bar, the sign of a strong increase in the viscosity due to the coagulation.

| Stirring speed (rpm) | Time before coagulation (s) |
|----------------------|------------------------------|
| 100                  | 45                           |
| 200                  | 21                           |

CONCLUSION

These results show that supplying greater shearing reduces the duration of the homogenization phase at an unchanging degree of hydrophobation.

2. Impact of the Hydrophobation of the Silica on the Kinetics of Coagulation with an Unchanging Supply of Mechanical Energy Masterbatches Prepared The masterbatches are prepared according to a process in accordance with the invention and in the following way.

Preparation of the Aqueous Dispersion (A) of Natural Rubber Latex

The natural rubber latex is weighed out into a glass beaker, a magnetic bar is added thereto and the latex is subsequently diluted in distilled water down to a concentration of 60% by weight of natural rubber.

Preparation of the Aqueous Filler Dispersion (B)

2.32 g of the partially hydrophobized silica prepared according to compositions 1 to 3, 5 and 6 described above are dispersed in 20 ml of water. The combined mixture is then homogenized using an ultrasound probe for two minutes. The silica agglomerated on the probe at the end of the two minutes is incorporated in the mixture using a spatula.

Preparation of the Masterbatch 3.3 g of each of the aqueous dispersions (B) are introduced into a 15 ml beaker and then 3.3 g of the aqueous dispersion (A) are added thereto. The mixture is mixed using the magnetic stirrer at a speed of 700 rpm.

Evaluation of the Characteristic Time $\tau$

Figure 1:
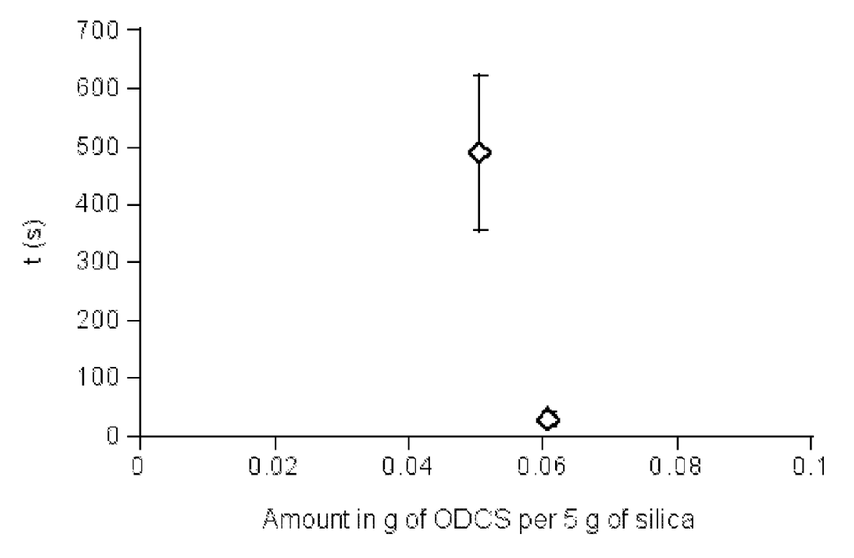

FIG. 1 shows the time observed before the macroscopic destabilization of the aqueous dispersion (C) for the various amounts of hydrophobing agents used, in this instance ODCS.

|                              | 1               | 2     | 3     | 5                            | 6                            |
|------------------------------|-----------------|-------|-------|------------------------------|------------------------------|
| No. of C atoms/nm$^2$        | 0.00            | 0.18  | 0.22  | 1.10                         | 8.04                         |
| Time before coagulation (s)  | No coagulation  | 500 s | <50 s | Filler not dispersible in water | Filler not dispersible in water |

FIG. 1 shows that the greater the ratio of the number of carbons carried by the hydrophobing agent, once attached to the silica, to the surface of the silica, the shorter the duration of the homogenization phase.

Thus, the duration of the homogenization phase preceding the coagulation phase can be controlled by the degree of hydrophobation of the filler, that is to say the ratio of the number of carbon atoms attached to the surface of the filler by the hydrophobing agent with respect to the surface area of the filler, and by the mechanical energy supplied to the dispersion (C).

The start of the coagulation phase can be controlled by an additional supply of mechanical energy.

The invention claimed is:

1. A process for the preparation of a masterbatch in the liquid phase based on one or more diene elastomers and on one or more fillers which do not coagulate spontaneously with the said latex, comprising the following successive stages:
    preparing a stable and homogeneous aqueous dispersion (C) by mixing
        one or more diene elastomer latexes (A) with
        one or more stable aqueous dispersions (B) of one or more fillers which do not coagulate spontaneously with the said latex and which are partially hydrophobized,
    homogenizing the aqueous dispersion (C), coagulating the aqueous dispersion (C) of the diene elastomer latex with the fillers which do not coagulate spontaneously with the said latex by supplying mechanical energy, recovering the coagulum, then drying the recovered coagulum in order to obtain the masterbatch.

2. The process according to claim 1, wherein the recovering of the coagulum is carried out by a filtering operation.

3. The process according to claim 1, wherein the recovering of the coagulum is carried out by a centrifuging operation.

4. The process according to claim 1, wherein the diene elastomer latex is a natural rubber latex.

5. The process according to claim 4, wherein the diene elastomer latex is a concentrated natural rubber latex.

6. The process according to claim 1, wherein the filler is chosen from silica ($SiO_2$), alumina ($Al_2O_3$), alumina monohydrate ($Al_2O_3.H_2O$), aluminium hydroxide [$Al(OH)_3$], aluminium carbonate [$Al_2(CO_3)_3$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium dioxide ($TiO_2$), titanium black ($TiO_{2n-1}$), calcium oxide (CaO), calcium hydroxide [$Ca(OH)_2$], aluminium magnesium oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminium silicate ($Al_2SiO_5.Al_4(SiO_4)_3.5H_2O$), magnesium silicate ($Mg_2SiO_4.MgSiO_3$), calcium silicate ($Ca_2SiO_4$), aluminium calcium silicate ($Al_2O_3.CaO.2SiO_2$), calcium magnesium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$], and crystalline aluminosilicates comprising atoms of hydrogen compensating for the charges, alkali metals or alkaline earth metals, and their mixture.

7. The process according to claim 6, wherein the filler is silica ($SiO_2$).

8. The process according to claim 1, wherein the filler is partially hydrophobized using one or more hydrophobing agents of following formula (I):

$$E_n\text{-}F \quad \text{(Formula I)}$$

wherein:

n is an integer equal to 1 or 2, when n has the value 1, then F is a monovalent group, when n has the value 2, then F is a divalent group, E represents a functional group which is capable of bonding physically and/or chemically to the filler and which comprises, in its structure, at least one alkyl or alkylene chain comprising from 1 to 18 carbon atoms which confers hydrophobing properties on the group E, F represents a group which may or may not bond physically and/or chemically to the diene elastomer.

9. The process according to claim 8, wherein the hydrophobing agent is of following formula (II):

$$[G_{(3-m)}(L\text{-}K)_m Si\text{-}L\text{-}]_n\text{-}F \quad \text{(II)}$$

with:

when n has the value 1, then F denotes the K group defined below and m varies from 0 to 2, and when n has the value 2, then F denotes an amino group, a polysulphide ($S_x$) group or an epoxy group and m varies from 0 to 2, and for which the G groups are chosen, independently of one another, from a hydrogen atom, a $C_1$-$C_{18}$ hydrocarbon group chosen from linear, branched or cyclic alkyl groups, aralkyl groups, alkylaryl groups and aryl groups, an alkoxy ($R_1O$)— group, in which $R_1$ represents a saturated $C_1$-$C_8$ alkyl radical, a halogen atom, and a hydroxyl group, provided that at least one G group is chosen from an alkoxy group, a chlorine atom or a hydroxyl group, L denotes a saturated or unsaturated and linear, branched or cyclic $C_1$-$C_{18}$ alkylene radical, optionally comprising an oxygen atom, K denotes a hydrogen atom, a halogen atom, such as or a functional group chosen from an amino group, a polyaminoalkyl group, a mercapto group, an epoxy group, a hydroxyl group, a vinyl group, an acryloxy group, a methacryloxy group, an —SCN group or an R(CO)S— group with R being a $C_1$-$C_{18}$ alkyl group.

10. The process according to claim 9, wherein the hydrophobing agent is chosen from chlorotrimethylsilane, chlorotriethylsilane, chlorotripropylsilane, bromotrimethylsilane, bromotriethylsilane, bromotripropylsilane, fluorotrimethylsilane, methoxytrimethylsilane, methoxytriethylsilane, methoxytripropylsilane, chlorotrimethylsilane, dichlorodimethylsilane, trichloromethylsilane, bromotrimethylsilane, dibromodimethylsilane, tribromomethylsilane, methoxytrimethylsilane, dimethoxydimethylsilane, trimethoxymethylsilane, tetramethoxysilane, trimethoxypropylsilane, trimethoxyoctylsilane, trimethoxyhexadecylsilane, dimethoxydipropylsilane, triethoxymethylsilane, triethoxypropylsilane, triethoxyoctylsilane, diethoxydimethylsilane, octenyldimethylchlorosilane, octodecyltrichlorosilane, (γ-aminopropyl)trimethoxysilane, (γ-aminopropyl)triethoxysilane, (gamma-hydroxypropyl)tripropoxysilane, (γ-mercaptopropyl)triethoxysilane, (γ-aminopropyl)dimethylethoxysilane, (γ-aminopropyl)dihydroxymethoxysilane, (glycidylpropyl)trimethoxysilane, [γ-(N-aminoethyl)aminopropyl]triethoxysilane, (γ-methacryloxypropyl)triethoxysilane, (γ-methacryloxypropyl)trimethoxysilane, (β-mercaptoethyl)triethoxysilane, [γ-(N-aminoethyl)propyl]trimethoxysilane, (N-methylaminopropyl)trimethoxysilane, (γ-thiocyanatopropyl)triethoxysilane, bis-(3-triethoxysilylpropyl)tetrasulfide, bis-(3-triethoxythiopropyl)tetrasulphide, vinyltriethoxysilane, vinylphenylmethylsilane, vinyldimethylmethoxysilane, divinyldimethoxysilane, divinylethyldimethoxysilane, dimethylvinylchlorosilane and their mixture.

11. The process according to claim 8, wherein the hydrophobing agent, once attached to the filler, comprises at most 30 carbon atoms.

12. The process according to claim 8, wherein the hydrophobing agent is chosen from octenyldimethylchlorosilane, bis(3-triethoxysilylpropyl)tetrasulphide and their mixture.

13. The process according to claim 8, wherein the partially hydrophobized filler has a degree of hydrophobation of between 0 and 1.10 carbon atoms carried by the hydrophobing agent, once attached to the filler, per $nm^2$ of filler surface area.

14. The process according to claim 1, wherein the process does not use a coagulating agent.

15. A masterbatch of diene elastomer and of filler prepared according to claim 1.

16. A rubber composition based on at least one masterbatch of diene elastomer and of filler prepared according to claim 1.

17. A finished or semifinished article comprising a rubber composition according to claim 16.

18. A tire tread comprising a rubber composition according to claim 16.

19. A tire or semifinished product comprising at least one rubber composition according to claim 16.

20. The process according to claim 9, wherein the $C_1$-$C_{18}$ hydrocarbon group is chosen from phenyl, benzyl, cyclopentyl, and cyclohexyl.

21. The process according to claim 9, wherein $R_1$ is selected from methyl, ethyl and isopropyl.

22. The process according to claim 21, wherein $R_1$ is methyl or ethyl.

23. The process according to claim 9, wherein the halogen atom is fluorine, chlorine, bromine, or iodine.

24. The process according to claim 9, wherein L is a saturated or unsaturated and linear, branched or cyclic $C_1$-$C_8$ alkylene radical.

25. The process according to claim 9, wherein L is methylene, ethylene, isopropylene, n-butylene, octadecylene, phenylene, cyclopentylene and cyclohexylene groups.

* * * * *